US012617156B2

(12) United States Patent
Matilainen et al.

(10) Patent No.: US 12,617,156 B2
(45) Date of Patent: May 5, 2026

(54) METHOD AND DEVICE FOR DETERMINING THE POSITION OF A PRE-FABRICATED DEVICE IN ADDITIVE MANUFACTURING

(71) Applicant: SANDVIK MACHINING SOLUTIONS AB, Sandviken (SE)

(72) Inventors: Ville-Pekka Matilainen, Sandviken (SE); Per Viklund, Sandviken (SE)

(73) Assignee: Sandvik Machining Solutions AB, Sandviken (SE)

( * ) Notice: Subject to any disclaimer, the term of this patent is extended or adjusted under 35 U.S.C. 154(b) by 275 days.

(21) Appl. No.: 18/287,385

(22) PCT Filed: Apr. 21, 2022

(86) PCT No.: PCT/EP2022/060636
§ 371 (c)(1),
(2) Date: Oct. 18, 2023

(87) PCT Pub. No.: WO2022/223743
PCT Pub. Date: Oct. 27, 2022

(65) Prior Publication Data
US 2024/0198600 A1     Jun. 20, 2024

(30) Foreign Application Priority Data
Apr. 22, 2021    (SE) .................................... 2100059-1

(51) Int. Cl.
*B29C 64/393*     (2017.01)
*B22F 10/31*     (2021.01)
*B33Y 50/02*     (2015.01)

(52) U.S. Cl.
CPC ............ *B29C 64/393* (2017.08); *B22F 10/31* (2021.01); *B33Y 50/02* (2014.12)

(58) Field of Classification Search
CPC ..... B29C 64/393; B29C 64/20; B29C 64/245; B22F 10/31; B22F 2005/002; B22F 7/08; B22F 10/20; B22F 10/85; B22F 12/30; B22F 12/90; B33Y 50/02; B33Y 10/00; B33Y 30/00; B33Y 40/00; B33Y 50/00
See application file for complete search history.

(56) References Cited

U.S. PATENT DOCUMENTS

| | | | |
|---|---|---|---|
| 11,084,213 B2 * | 8/2021 | Pieger ..................... | B22F 12/90 |
| 2013/0089642 A1 | 4/2013 | Lipson et al. | |
| 2015/0105891 A1 | 4/2015 | Golway et al. | |

(Continued)

FOREIGN PATENT DOCUMENTS

| | | |
|---|---|---|
| CN | 110246215 A | 9/2019 |
| EP | 3450055 A1 | 3/2019 |

(Continued)

*Primary Examiner* — Francis C Gray
(74) *Attorney, Agent, or Firm* — Corinne R. Gorski

(57) ABSTRACT

A method for determining a position of a base device in an additive manufacturing device is provided. The method includes positioning a position determining device, PDD, on the base device, such that the PDD protrudes from the base device after positioning, wherein the PDD includes an edge. The method further includes determining the position of the PDD based on the edge of the PDD, and based on the position of the PDD, determining the position of the base device.

9 Claims, 4 Drawing Sheets

(56)         References Cited

U.S. PATENT DOCUMENTS

| | | | |
|---|---|---|---|
| 2018/0071824 A1* | 3/2018 | Gubelmann | ............. B26F 3/00 |
| 2018/0200800 A1 | 7/2018 | Hart et al. | |
| 2019/0091934 A1 | 3/2019 | Cooper | |
| 2019/0366491 A1 | 12/2019 | Ozturk et al. | |
| 2020/0171811 A1 | 6/2020 | Bell et al. | |
| 2020/0238447 A1 | 7/2020 | Fedyk et al. | |
| 2020/0290123 A1* | 9/2020 | Anton | .................... B22F 10/14 |
| 2020/0391324 A1 | 12/2020 | Geisen | |

FOREIGN PATENT DOCUMENTS

| | | | |
|---|---|---|---|
| EP | 3878631 A1 | 9/2021 | |
| RU | 2671374 C1 | 10/2018 | |

* cited by examiner 101
151
100
150

165

160

METHOD AND DEVICE FOR DETERMINING THE POSITION OF A PRE-FABRICATED DEVICE IN ADDITIVE MANUFACTURING

RELATED APPLICATION DATA

This application is a § 371 National Stage Application of PCT International Application No. PCT/EP2022/060636 filed Apr. 21, 2022 claiming priority to SE 2100059-1 filed Apr. 22, 2021.

TECHNICAL FIELD

The present disclosure relates generally to methods and devices for determining the position of a base device, especially a base device used for hybrid builds in additive manufacturing.

BACKGROUND

Additive manufacturing, also known as 3D printing, generally involves manufacturing, or printing, one layer at a time using specialized systems. In particular, a layer of material may be deposited on the working surface of a build chamber and bonded with another layer of the same or of a different material. Additive manufacturing may be used to manufacture articles from computer-aided design models using techniques such as powder bed fusion (PBF) and binder jetting.

In some applications, additive manufacturing may be used to manufacture an article on top of a pre-manufactured base device, commonly referred to as a blank, and such articles are often referred to as hybrid articles.

When manufacturing hybrid articles, it is crucial to have accurate information regarding the position of the base device, in order to position the article correctly on top of the base device. The position of the base device may be seen as having at least two relevant components, one being the position in space, and the other being the rotational position of the base device.

Determining the position of the base device in can be done by e.g. using a laser to scan the edge of the blank, although this may negatively impact the blank. Further, determining the position, especially the rotational position, of the base device may be difficult, especially in cases where the base device is round or cylindrical.

Consequently, there exists a need for improvement when it comes to determining the position of base devices used when manufacturing hybrid articles using additive manufacturing.

SUMMARY

It is an object of the invention to address at least some of the problems and issues outlined above. An object of embodiments of the invention is to provide a better way for determining the position of a base device in an additive manufacturing device. Another object is to provide a method for determining the position of a base device without negatively impacting the base device. Another object is to provide a device which maybe used for determining the position of a base device.

According to one aspect a method for determining a position of a base device in an additive manufacturing device is provided. The method comprises positioning a position determining device, PDD, on the base device, such that the PDD protrudes from the base device after positioning, wherein the PDD comprises an edge. The method further comprises determining the position of the PDD based on the edge of the PDD, and based on the position of the PDD, determining the position of the base device.

According to another aspect, a Position Determining Device, PDD, adapted to be positioned onto a base device of an additive manufacturing device, is provided. The PDD comprises a main body adapted to fit a base device and a feature adapted to be positioned into an existing recess of the base device. The PDD further comprises an edge, wherein the edge is used for determining the position of the PDD when the PDD is attached to the base device.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, the present disclosure relates to a method and a device for determining a position of a base device used in additive manufacturing, wherein a base device is a device on top of which an article is to be manufactured using additive manufacturing. The method comprises positioning a Position Determining Device, PDD, on the base device, optionally into a pre-existing recess of the base device. The method further comprises determining the position of the PDD, after it has been positioned on the base device, and based on the position of the position of the PDD, determining the position of the base device. The position of the base device which is being determined may be either a rotational positional, a spatial position, or both.

For the purpose of this disclosure, a base device is a device upon which an article is to be manufactured using additive manufacturing technologies. The base device may for example be a drill and the article to be manufactured on top of the drill may be a drill tip. According to some embodiments, the base device is a generic machine interface, such as a Capto, HSK or similar, and the tool is a turning tool, milling tool or drilling tool. In some embodiments, the base device is intended to form a part of the finished article, such that the finished article is constituted by the base device and the article manufactured on top of the base device.

An insight which is relevant for the present disclosure, is that by adding a relatively simple device which can easily be attached and detached from the base device, a cost efficient and very accurate method for determining the position of the base device may be achieved, without having to modify the base device itself. The rotational position of the base device may be difficult to determine for the base device, especially in case the base device has a round shape. The spatial position of the base device may in some cases also be better determined by using the PDD than by measuring the actual base device, for example when a laser is used for determining the position of the base device and when the base device comprises a material which may be negatively impacted by the laser. The rotational and/or spatial position of the base device may also be difficult to determine in case the base device is an object without any edges, and thus adding a PDD comprising an edge may be beneficial. The present disclosure provides a better way of determining the rotational and/or spatial position of a base device, by attaching a PDD and making a position determination based on the position of the PDD.

Figure 1:
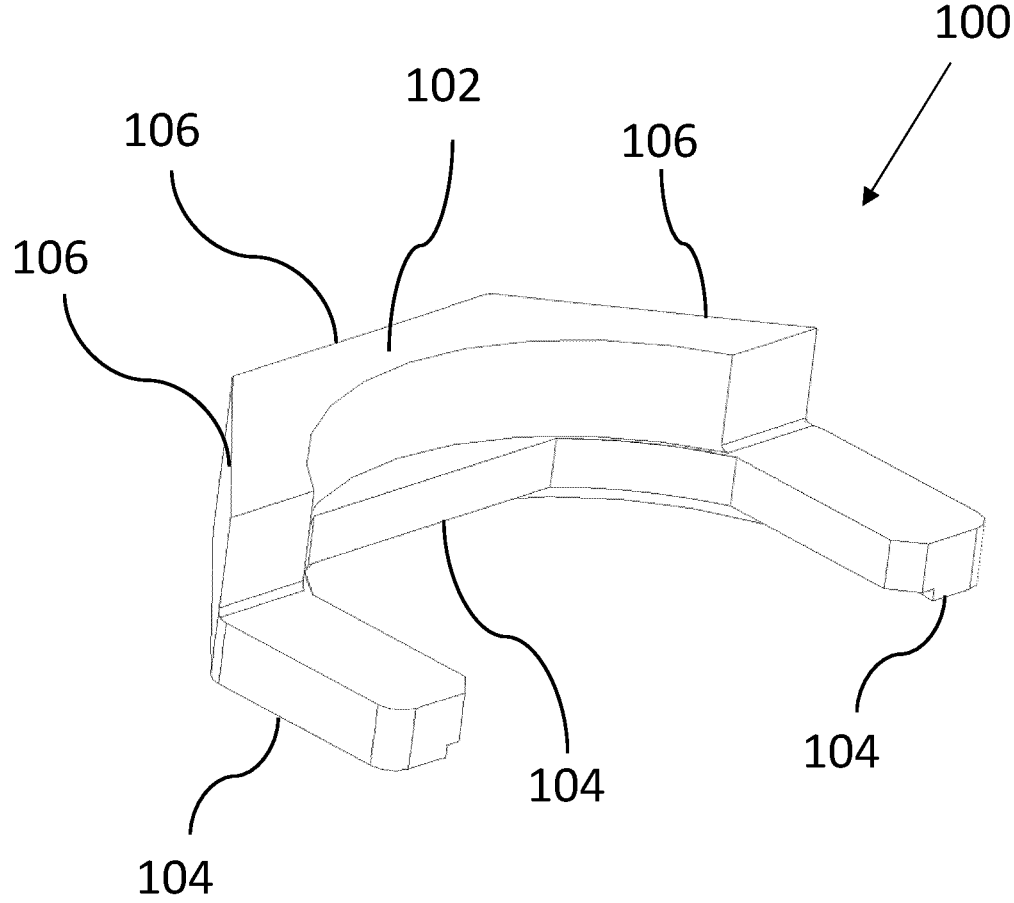
FIG. 1 shows a Position Determining Device, PDD, according to an embodiment.

Looking now at FIG. 1, a Position Determining Device 100, PDD, according to an embodiment will now be described.

The PDD 100 comprises a main body 102, adapted in shape and dimension to fit a base device to which it is to be attached. In the embodiment shown in FIG. 1, the PDD 100 is adapted to be attached to a round base device, and thus the main body 102 is also round in shape in the part which faces the base device.

The PDD comprises at least one edge 106, which may in some embodiments be part of the main body 102. In some embodiments, the edge may be comprised in another part of the PDD. For the purpose of this disclosure, an edge is considered to be formed between two surfaces which have an angle of 90 degrees or less in between them. A purpose of the edge 106 is that a light source which is applied over the edge should provide a clear break in its reflection when it passes the edge, which may make determination and subsequent analysis of the reflection easier and faster.

In some embodiments, the PDD may comprise a plurality of edges, wherein one edge is considered distinct from another if there is an angle between the two edges which is larger than 5 degrees. A reason for having a plurality of edges is that each edge may constitute a data point used for determining the position of the PDD, and by having a plurality of edges a plurality of data points can be used, which may be advantageous for position determining purposes. In the embodiment shown in FIG. 1, the main body 102 comprises three distinct edges 106, which are all part of the main body 102.

The PDD 100 comprises at least one feature 104, adapted to be attached to the base device. In some embodiments, the feature 104 is adapted to be positioned into an existing recess of the base device. In some embodiments, the PDD 100 may comprise a plurality of features 104 adapted to be positioned into corresponding recesses of the base device. In some embodiments, the main body 102 may also be adapted to be positioned into an existing recess of the base device, and may comprise another feature 104 adapted for this purpose. In some embodiments, the feature 104 may comprise fastening means such as screws and clamping devices. As can be seen, the embodiment of FIG. 1 comprises three features 104, wherein one of the features may be seen as part of the main body 102.

The main body 102 may further be adapted to be positioned such that the top part of the PDD 100 is at substantially the same level as the base device, when the PDD is attached to the base device.

In some embodiments, the PDD may comprise reflective material. A purpose of having reflective material is so that a light beam can better be reflected from the PDD, which may be advantageous for determining the position of the PDD. In some embodiments, the entire PDD may comprise a reflective material. In some embodiments, the edge 106 of the PDD, and/or the two surfaces on different sides of the edge 106, comprise a reflective material.

In some embodiments, the PDD comprises a heat resistant material. This is especially relevant for embodiments wherein a light beam is used for determining the position of the PDD, since the PDD could otherwise be negatively impacted by the light beam.

Figure 2:
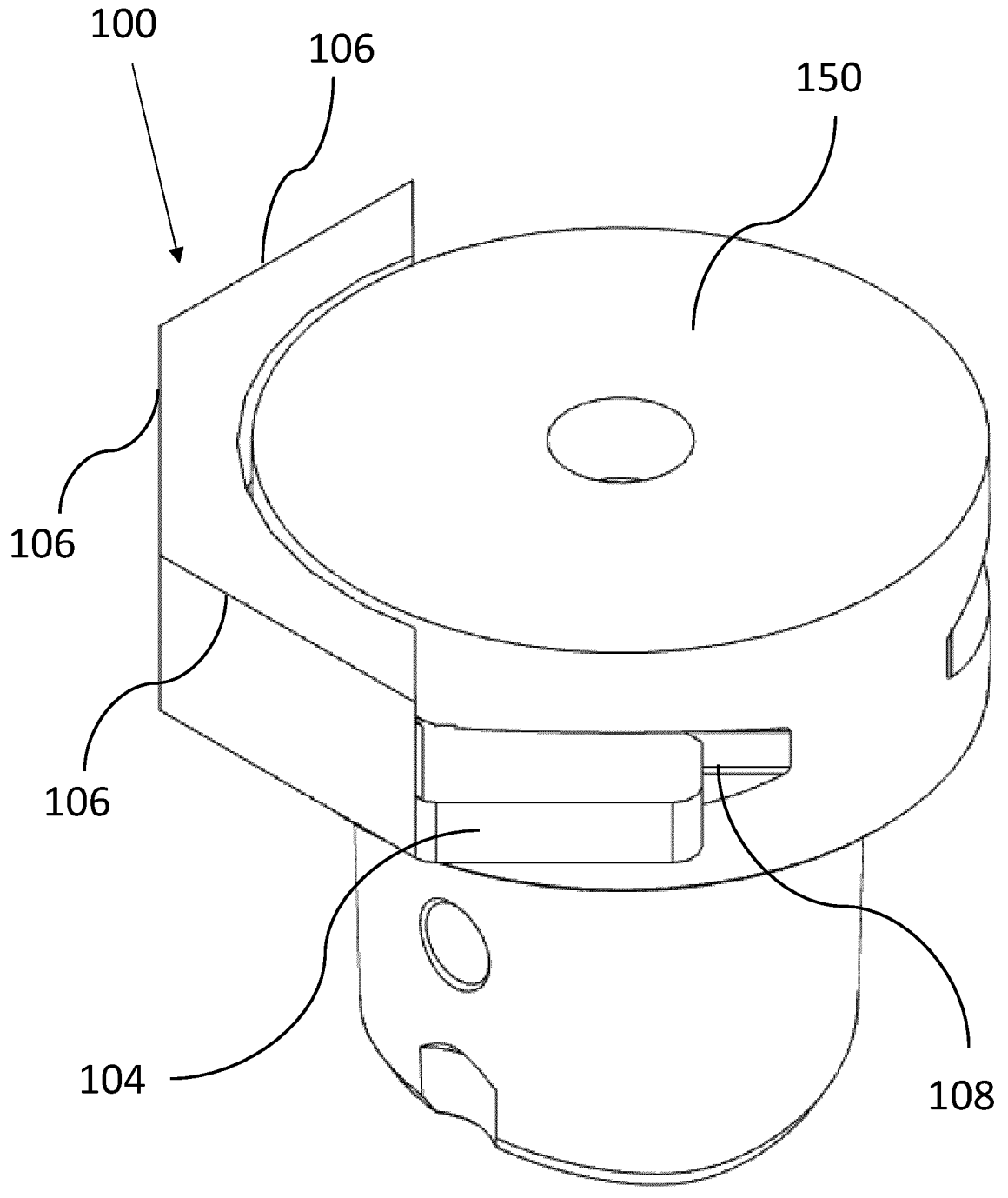
FIG. 2 shows the PDD of FIG. 1 attached to a base device.

Looking now at FIG. 2, a PDD 100 according to an embodiment, positioned on and attached to a base device 150 is shown.

The PDD 100 is, in the shown embodiment, positioned in an existing recess 108 of the base device 150. In some embodiments, the PDD 100 may be positioned on the base device 150 by any suitable attachment means, such as e.g. screws or clamping means.

The PDD has to protrude from the base device 150 to at least some extent, i.e. it cannot be positioned inside of the base device. In some embodiments, the PDD protrudes laterally from the base device 150 after being positioned thereon. In some embodiments, the PDD only protrudes laterally from the base device 150, i.e. it does not protrude downwardly or upwardly.

As previously described, the PDD comprises an edge 106. The edge 106 facilitates determining the position of the PDD, especially in cases where the position of the PDD is determined using a light beam. Thus, the edge is used, or is adapted to be used, or is usable, for determining the position of the PDD. In some embodiments, the edge has an extension between 1 and 50 mm in a longitudinal direction of the edge. In some embodiments, the edge has an extension of approximately 25 mm in a longitudinal direction of the edge.

The combination of the PDD 100 and the base device 150 when the PDD is attached to the base device 150, is preferably not rotationally symmetric. Determining the rotational position for a base device 150 which is rotationally symmetric along one axis may be difficult, and one purpose of adding the PDD 100 is to make the resulting shape of a base device with a PDD attached to it be not rotationally symmetric.

The PDD may in some embodiments be adapted to be positioned along the circumference of the base device 150. In some embodiments, the PDD is positioned along approximately 50% of the circumference of the base device 150. In some embodiments, the PDD is positioned along up to 50% of the circumference of the base device 150.

In some embodiments (not shown), the PDD may comprise a cover adapted to be positioned on top of the base device, such that it at least partially covers the base device when seen from above. The purpose of having such an embodiment may be to further protect the base device from any negative impact when using a light source for position determination, if the light source is applied where the base device is located.

Figure 3:
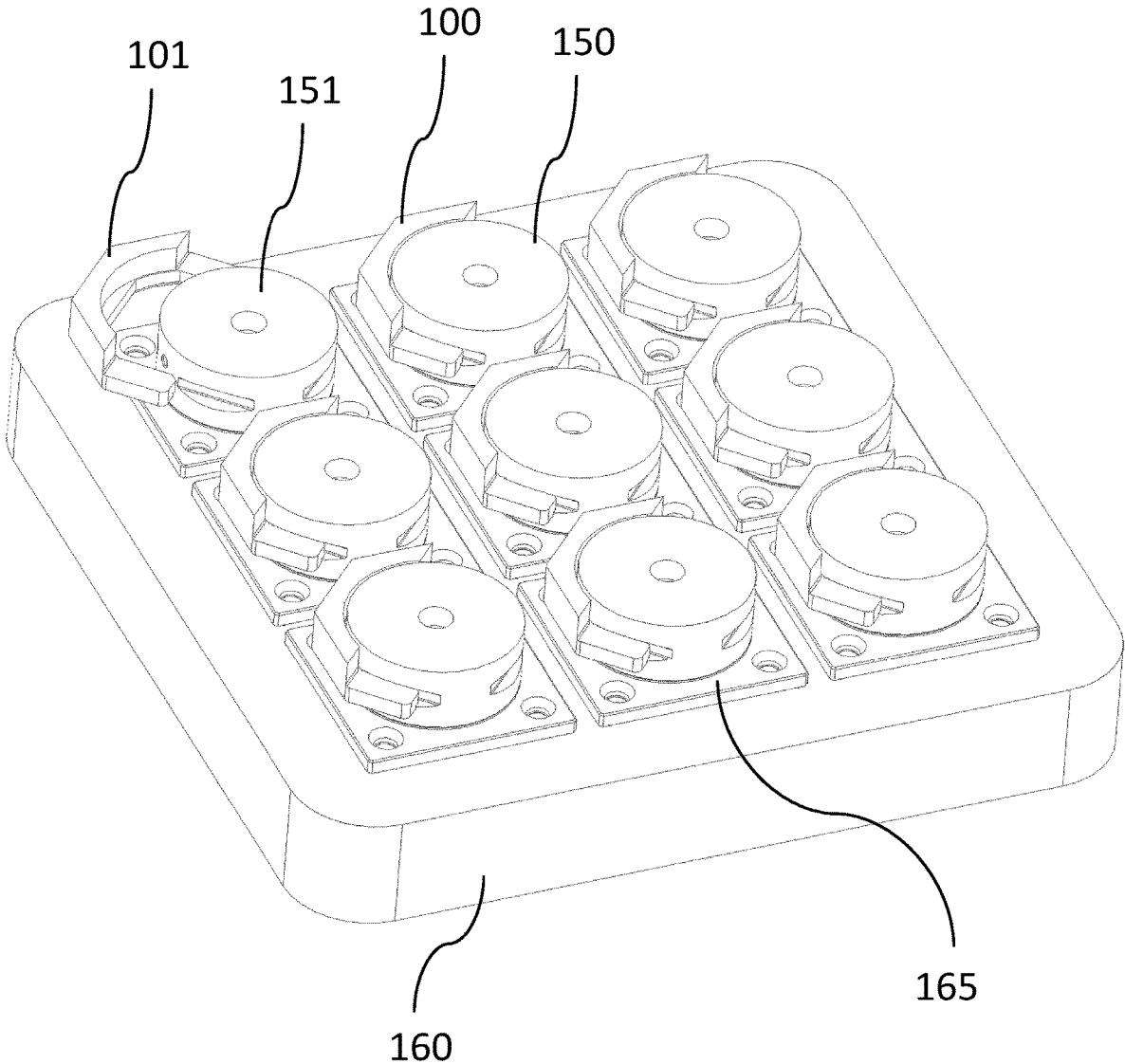
FIG. 3 shows a plurality of PDDs of FIG. 1 attached to a plurality of base devices, on a base plate of an additive manufacturing device.

Looking now at FIG. 3, a plurality of PDDs 100, attached to a plurality of base devices 150 are shown, positioned on a base plate 160 of an additive manufacturing device is shown.

The base plate may comprise a sleeve 165 for each base device 150, such that the base device 150 is positioned into the sleeve 165. According to some embodiments, the base device 150 may only be positioned into the sleeve 165 in one way. In some embodiments, the base device 150 may only be positioned into the sleeve in a limited amount of ways, e.g. 2, 4 or 6. According to some embodiments, each base device 150 on a base plate is positioned in the same way into its corresponding sleeve 165, which entails that all base devices have the same rotational position.

Depending on the amount of base devices to be positioned onto the base plate, the way to position a PDD onto a base device 150 may be constrained. As can be seen in the figure, the PDD 101 in the top left corner may more easily be positioned onto the base device 151 from the top left corner, compared to the other directions. In such embodiments, the method for determining a position of the base device may comprise a step of determining a relative position between the PDD and the base device, if the PDD is positioned differently than it usually is onto the base device.

In some embodiments, the base devices 150, or a single base device 150, is positioned on the base plate 160, also referred to as a build plate 160.

Figure 4:
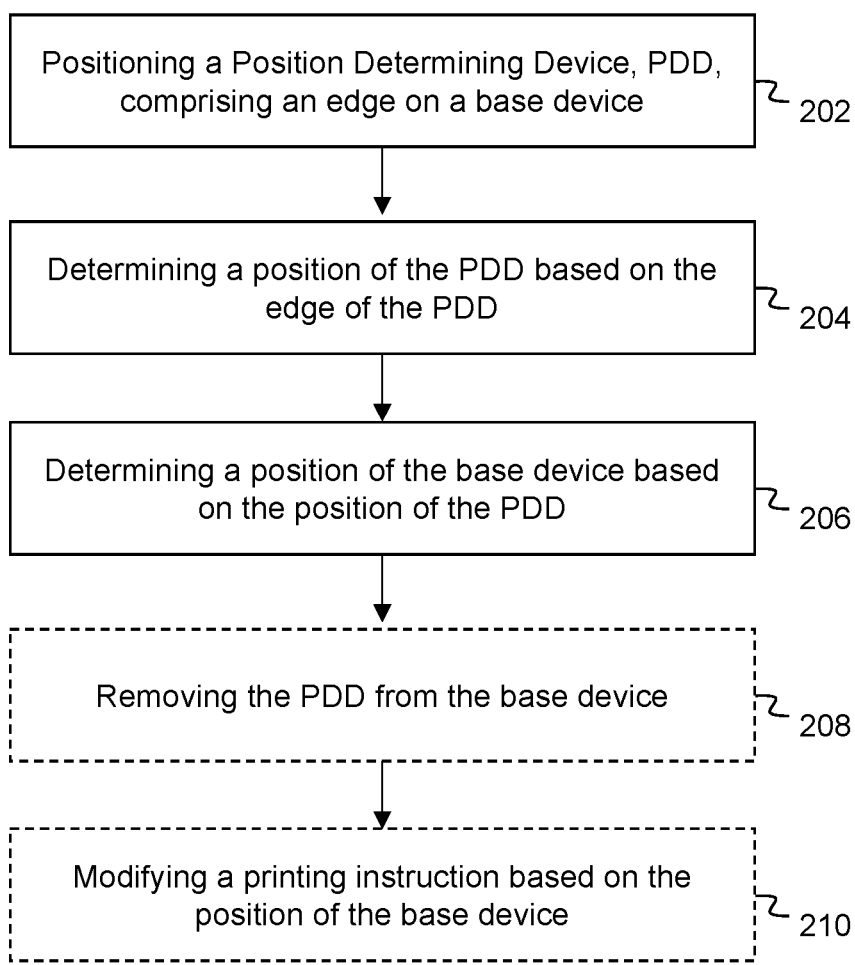
FIG. 4 shows a flow chart of a method for determining a position of a base device, according to an embodiment.

Looking now at FIG. 4, in conjunction with FIG. 2, the steps of a method for determining the position of a base device 150 will now be described in more detail.

The method comprises a first step of positioning 202 a position determining device, PDD 100, on the base device 150, such that the PDD 100 protrudes from the base device 150 after being positioned thereon, wherein the PDD 100 comprises an edge 106. A purpose of this step is to fix the position of the PDD 100 relative to the base device 150. In some embodiments, the base device 150 is positioned in an additive manufacturing device, when the PDD 100 is positioned on the base device 150.

In some embodiments, the PDD 100 can be positioned in a plurality of ways in relation to the base device 150. For example, as in FIG. 2, the base device 150 may comprise four recesses, and the PDD 100 can thus be positioned in four different ways relative to the base device 150.

In some embodiments the step of positioning 202 the PDD 100 comprises positioning the PDD 100 in a known position relative to the base device 150, such that the relative position between the PDD 100 and the base device 150 is known after the PDD 100 has been positioned on the base device 150.

In some embodiments, positioning the PDD 100 on the base device 150 comprises positioning the PDD 100 into an existing recess of the base device 150. Many commonly used base devices have a known and standardized shape, which comprises at least one recess. In some embodiments, the PDD 100 can only be positioning into the at least one recess of the base device 150 in one way, which may make the subsequent positional determinations easier, faster and more accurate. Further, by using an existing recess in the base device 150, a better fitting of the PDD 100 may be achieved than if the base device 150 does not contain a recess, and without requiring an additional step of modifying the base device 150 with a recess.

The method further comprises determining 204 a position of the PDD 100, based on the edge 106 of the PDD 100. After the PDD 100 has been fixed to the base device 150, the PDD 100 should not move unless the base device 150 is moved, and thus have a fixed relative position to the base device 150. Determining the position of the PDD 100 comprises determining the position of at least one part of the PDD 100. Since the size and shape of the PDD 100 is known, it is possible to extrapolate its entire position based on a relatively small part of it. In some embodiments, the determining 204 a position of the PDD 100 comprises determining only the spatial position of the PDD 100. In some embodiments, the determining 204 comprises determining only the rotational position of the PDD 100. In some embodiments, the determining comprises determining either of the rotational position and the spatial position of the PDD 100. In some embodiments, the determining comprises determining both the rotational position and the spatial position of the PDD 100. That the determination if based on the edge 106 of the PDD 100 entails that the edge 106 of the PDD 100 is used for the position determination, for example by scanning over the edge 106 using a light source.

The method further comprises determining 206 a position of the base device 150, based on the position of the PDD 100. Since the position of the PDD 100 is fixedly attached to the base device 150, and the base device 150 is fixed in the additive manufacturing device, the relationship between the position of the PDD 100 and the position of the base device 150 is also fixed. And, since the shape and size of the PDD 100 is known, it is possible to extrapolate the position of the PDD 100 from the position of the PDD 100 in space. Further, since the combination of the PDD 100 and the base device 150 is not rotationally symmetric, the rotational position of the PDD 100, and subsequently the rotational position of the base device 150, may be more easily determined than for a rotationally symmetric base device 150.

In some embodiments, the position of the base device 150 referred to in the determining 206 is the spatial position. In some embodiments, the position of the base device 150 referred to in the determining 206 is the rotational position. In some embodiments, the position of the base device 150 referred to in the determining 206 is both the rotational position and the spatial position.

In some embodiments, determining 204 the position of the PDD 100 comprises scanning the base device 150 and the PDD 100, including the edge 106 of the PDD 100. The scanning may be done with any suitable light source, such as a laser.

In some embodiments, determining 204 the position of the PDD 100 comprises scanning only the PDD 100, including the edge 106 of the PDD 100, with a light source, and not the base device 150. Such embodiments are relevant especially in case the base device 150 comprises a material which may be negatively impacted by the light source. Since the relative position of the base device 150 and the PDD 100 is known, the position of the base device 150 may thus be determined based on the position of the PDD 100.

In some embodiments, the step of determining 204 comprises measuring a reflection from the light source, wherein the position of the PDD 100 is determined based on the reflection.

In some embodiments, the edge 106 of the PDD 100 has an extension of at least 5 mm in a longitudinal direction of the edge 106.

In some embodiments, the edge 106 is positioned at a distance of approximately 10 mm from any reflecting surface below it. In embodiments wherein the base device 150 is positioned in an additive manufacturing device, this entails that the edge is positioned at the aforementioned distance from any reflecting surface of the additive manufacturing device.

In some embodiments, the method further comprises removing the position determining device. In some embodiments, the removing of the PDD 100 comprises removing the PDD 100 without removing the base device 150 from the additive manufacturing device.

In some embodiments, the PDD 100 is positioned such that the top surface of the PDD 100 is at approximately the same level as the top of the base device 150.

In some embodiments, the method further comprises determining a relative position between the PDD 100 and the base device 150, after the PDD 100 has been positioned on the base device 150. This step may be relevant in embodiments where the relative position between the PDD 100 and the base device 150 is not known, for example if the PDD 100 is positioned in an unusual way, or if the positioning of the PDD 100 relative to the base device 150 is constrained, e.g. due to the layout of the base plate of an additive manufacturing device, or due to the size and shape of the base device 150, or due to fitting a plurality of base devices onto the same base plate.

In some embodiments, the base device 150 is a tool interface.

In some embodiments, the positioning 202 of the PDD on the base device is done such that the resulting combination of the PDD and the base device has a shape which is rotationally asymmetric.

In some embodiments, the method further comprises modifying 210 a printing instruction to the additive manufacturing device, based on the position of the base device 150. Typically, this may entail improving the printing instruction by providing more accurate positional information about the base device 150, wherein the positional information comprises at least one of the rotational position and the spatial position of the base device 150.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

8

The invention claimed is:

1. A method for determining a position of a base device in an additive manufacturing device, the method comprising:

positioning a position determining device, PDD, on the base device, such that the PDD protrudes from the base device after positioning, wherein the PDD includes an edge;

determining a position of the PDD based on the edge of the PDD;

based on the position of the PDD, determining a position of the base device; and removing the PDD from the base device prior to initiating an additive manufacturing process.

2. The method according to claim 1, wherein determining the position of the PDD based on the edge of the PDD includes scanning the edge of the PDD with a light source.

3. The method according to claim 2, wherein determining the position of the PDD further includes scanning the base device with the light source.

4. The method according to claim 1, wherein determining the position of the base device includes determining the rotational position of the base device.

5. The method according to claim 1, wherein determining the position of the base device includes determining a spatial position of the base device.

6. The method according to claim 1, wherein the positioning of the PDD includes positioning the PDD into an existing recess of the base device.

7. The method according to claim 1, further comprising determining a relative position between the PDD and the base device.

8. The method according to claim 1, wherein the PDD is positioned such that a top surface of the PDD is level with a top of the base device.

9. The method according to claim 1, further comprising modifying a printing instruction to the additive manufacturing device, based on a rotational position of the base device.

* * * * *